No. 752,865. PATENTED FEB. 23, 1904.
C. SCHUSTER & C. N. BERGMANN.
ELECTRIC ARC LAMP.
APPLICATION FILED MAR. 20, 1902. RENEWED JULY 18, 1903.
NO MODEL.
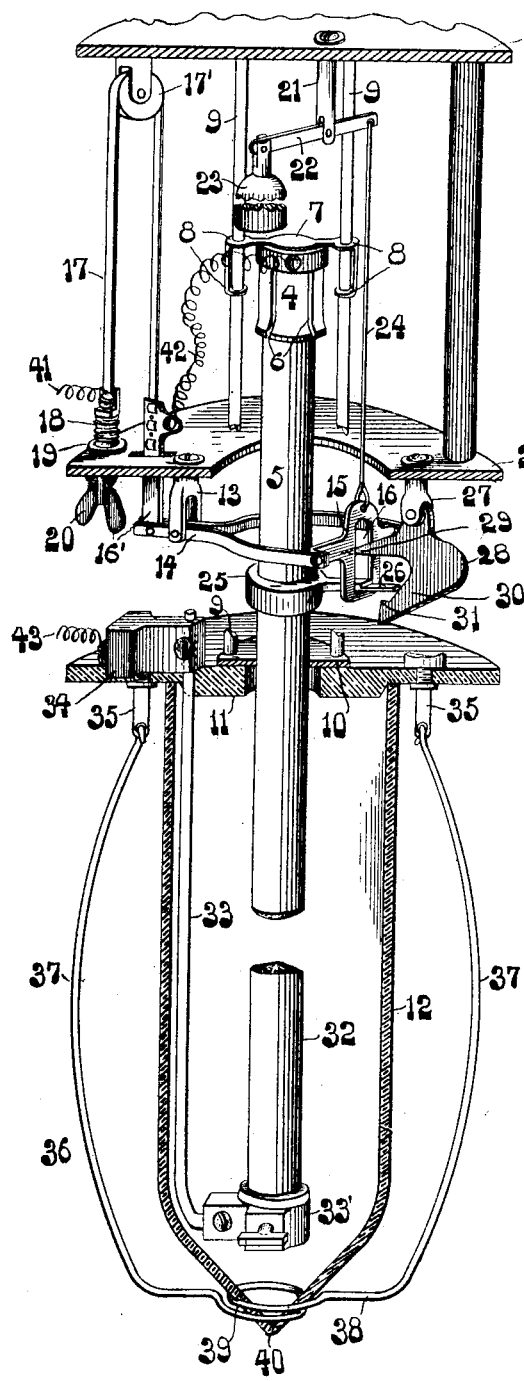
WITNESSES:
Geo. H. Harvey.
F. N. Barber.
INVENTORS,
Carl Schuster and Christian N. Bergmann,
by Wm L. Pierce
Their Attorney.

No. 752,865. Patented February 23, 1904.

UNITED STATES PATENT OFFICE.

CARL SCHUSTER AND CHRISTIAN N. BERGMANN, OF PITTSBURG, PENNSYLVANIA.

ELECTRIC-ARC LAMP.

SPECIFICATION forming part of Letters Patent No. 752,865, dated February 23, 1904.

Application filed March 20, 1902. Renewed July 18, 1903. Serial No. 166,194. (No model.)

*To all whom it may concern:*

Be it known that we, CARL SCHUSTER and CHRISTIAN N. BERGMANN, citizens of the United States, residing at Pittsburg, in the county of Allegheny and State of Pennsylvania, have invented or discovered new and useful Improvements in Arc-Lamps, of which the following is a specification.

The figure shows an arc-lamp involving our invention partly in perspective and partly in vertical section.

Our invention relates to arc-lamps wherein the carbon is fed by an expansive strip, and relates more particularly to the means by which the carbon is fed.

It also relates to means for reflecting the light and to means for holding the inner globe in position.

1, 2, and 3 represent the top, middle, and bottom disks, respectively, by which all the parts of the lamp are supported.

4 is a carbon-holder for the upper carbon 5 and consists of a tube having longitudinal kerfs 6, dividing the tube into spring-fingers, which, being wedged apart by entering carbon, tightly hold the same. The top of the holder 4 has a horizontal cross-head 7, each end of which is bent twice at a right angle, the two horizontal portions having each an eye 8. Two brass rods 9 9 are supported by the disks 1 and 3 and pass through the eye 8 to guide the cross-head 7.

10 is a brass disk fastened to the top of disk 3 and has two holes which receive the lower ends of rods 9, the holes extending entirely through the disk 10. The rods 9 rest upon the top of disk 3, which is preferably composed of porcelain. This disk has a hub 11, around which the upper end of the globe 12 fits. The portion of the disk 3 in contact with the globe is preferably ground so as to make as tight a fit as possible between the disk and the globe, and the remainder of the lower surface of the disk is glazed in order to reflect the light.

The disks 2 and 3 have each an opening to receive the carbon 5, the opening in disk 2 being larger in order to receive the rods 9 and the link 24.

Pivoted in a fork 13 on the under side of disk 2 is the forked lever 14, whose divergent members lie on opposite sides of the carbon 5, the ends of these members being connected by the stirrup 15, having the slot 16. The shorter end of the lever 14 has fastened thereto the strip 16', to which the expansive metallic strip or ribbon 17 is fixed. The strip 17 passes over lava sheave 17' and downward to the top of the bolt 18, reciprocable in opening 19 in disk 2 and adjustable therein by means of the winged nut 20.

Pivoted in a post 21 on the bottom of disk 1 is a lever 22, carrying at one end the swinging weight 23 and at the other end a link 24, connected to the stirrup 15.

Above the disk 3 and around the carbon 5 is a ring-clutch 25, having an operating-arm 26 in the lower portion of opening 16 of the stirrup 15.

Pivoted to a post 27 on the under side of disk 2 is a two-armed catch 28, having its upper inwardly-extending member 29 in the opening 16 above the arm 26 and its lower downwardly and inwardly extending member 30 provided with a horizontal shoulder 31, adapted to act as a catch for the arm 26.

The lower carbon 32 is supported by the holder 33' on the rod 33, whose upper end is secured in the terminal block 34 on top of the disk 3.

Two posts 35 35 on the under side of disk 3 are provided with eyes to receive the oppositely-arranged hooks on the upper ends of the spring globe-holder 36, the hooks entering the eyes from opposite directions. This holder is made of spring-wire and has two bowed sides 37 and a connecting portion 38, having an integral coiled eye 39 to receive the teat 40 on the lower end of the globe 12.

The electric current enters by the terminal wire 41 and passes along the ribbon or strip 17 to the strip 16' and then over wire 42 to the carbon-holder 5. After passing over the carbons 5 and 32 and rod 33 the current is conducted through block 34 and terminal wire 43.

The upper carbon is inserted through the openings in the disks 2 and 3 and pushed up into its holder 4. The lower carbon is also clamped in its holder 33'.

The globe 12 is placed on its seat and the sides 37 of the spring-holder 36 are compressed to lower the eye 39, so that it will pass below the teat 40. The eye being brought below the teat, the sides of the holder expand and lift the eye to receive the teat, as shown in the drawing. If the teat be not too sharp, the holder may be sprung over the same without compressing the sides 37.

Suppose the carbons to touch each other, the clutch-ring 25 to lie upon the disk 10, the stirrup 15 to be at its lowest position, and the weight 23 raised, the current when turned on will be strong, since there is no air-gap between the carbons, and the ribbon 17 will therefore be quickly expanded. The expansion of the ribbon allows the weight 23, acting on the stirrup and clutch-ring, to raise the upper carbon, so that the clutch-arm 26 will be slightly above the shoulder 31, allowing the shoulder to swing under the arm 26, and so preventing the upper carbon from pulling a shorter arc than five-sixteenths of an inch. As the carbons are separated the current diminishes until the contracting ribbon pulls the stirrup downwardly, so as to counteract the weight 23. As the carbon wastes away the contracting ribbon lowers the carbon until the arm 26 rests on the shoulder 31 of the catch 28. The carbon 5 will now remain stationary until the contracting ribbon pulls the stirrup 15 down, so that the top of the slot 16 by engagement with the upper arm 29 of the catch 28 moves the shoulder 31 away from the arm 26, allowing the carbon 5 and the clutch-ring to drop. As soon as the carbons touch each other the increased current at once causes the ribbon to lengthen and the stirrup to be raised by the weight 23, as before.

The drawing shows the parts in the position which they assume when the carbon 5 has been raised. When the clutch reaches the lowest position, the lever 22 will be operated so that the weight 23 will stand above the pivot of the lever, and consequently nearer to the vertical plane including the said pivot. The result is that the weight is raised more easily and rapidly as the ribbon contracts until the clutch releases the carbon and that the tension on the ribbon is less during its contraction, thus permitting the ribbon to contract much faster than if the lever should assume a horizontal position at the moment of maximum contraction of the ribbon.

By placing the weight on a part distinct and separate from the clutch-operating lever rather than on that end of the lever 14 which carries the ribbon we are enabled to use a very light weight, as we connect the link 24 to the long arm of the lever 14 and the weight to the long arm of the lever 22; but we do not desire to be restricted to the precise arrangement shown, as equivalent arrangements could be devised while still having the weight indirectly operate the lever 14. Furthermore, there is not sufficient room on the short end of the lever 14 on which to hang the weight, as the end of the lever lies too near the housing, and it is not practical, owing to the ratio of the travel of the carbon and the expansion of the spring, to place the pivot of the spring nearer the center of the lamp, as the two arms of the lever must be very unequal, as shown.

Having described our invention, what we claim is—

1. In an arc-lamp, an expansive strip, a carbon-clutch, a lever connected to the strip and the clutch, a weight, and a connection distinct from the lever between the weight and the lever, whereby the tension of the strip is regulated and the carbons separated by the weight.

2. In an arc-lamp, an expansive strip, a carbon-clutch, a lever connected to the strip and the clutch, a second lever, a weight on the second lever, and a connection between the two levers.

3. In an arc-lamp, an expansive strip, a carbon-clutch, a lever connected to the strip and the clutch, a screw to which the strip is connected, and a nut on the screw for adjusting the tension of the strip.

4. In an arc-lamp, a clutch for raising, holding and lowering a carbon, means engaging the clutch for raising it, means for holding the carbon stationary while in the grip of the clutch, and means for releasing the holding means.

5. In arc-lamps, an expansion-strip, a carbon-clutch, a lever associated with the strip and the clutch, a catch arranged to be engaged by the clutch and to stop the feed of the carbon, and means for tripping the catch.

6. In arc-lamps, an expansion-strip in the circuit, a carbon-clutch, a lever operatively associated with the strip and the clutch, and a catch for arresting the motion of the clutch, the lever and the catch coöperating with the clutch on the same side of the carbon.

7. In arc-lamps, a carbon-feed regulator comprising an expansive strip in the circuit, a single carbon-clutch, a lever operatively associated with the strip and the clutch, a catch for arresting the clutch, and means for tripping the catch.

Signed at Pittsburg this 14th day of March, 1902.

CARL SCHUSTER.
CHRISTIAN N. BERGMANN.

Witnesses:
H. O. HOSEAGE,
H. A. RIFE.